United States Patent [19]

Seeger

[11] 4,428,109

[45] Jan. 31, 1984

[54] LATHE

[75] Inventor: Friedrich Seeger, Wissmar, Fed. Rep. of Germany

[73] Assignee: Heyligenstaedt & Co. Werkzergmaschinenfabrik GmbH, Giessen, Fed. Rep. of Germany

[21] Appl. No.: 270,148

[22] Filed: Jun. 3, 1981

[30] Foreign Application Priority Data

Jun. 24, 1980 [DE] Fed. Rep. of Germany ....... 3023539

[51] Int. Cl.³ .......................................... B23Q 3/155
[52] U.S. Cl. .................................................... 29/568
[58] Field of Search ................ 29/568, 26 A; 211/121

[56] References Cited

U.S. PATENT DOCUMENTS

| | | | |
|---|---|---|---|
| 3,744,124 | 7/1973 | Gardner | 29/568 |
| 3,807,011 | 4/1974 | Harman et al. | 29/568 |
| 3,867,756 | 2/1975 | Koch | 29/568 |
| 3,925,877 | 12/1975 | Junike et al. | 29/568 |
| 4,020,545 | 5/1977 | Slavinski et al. | 29/568 |

FOREIGN PATENT DOCUMENTS

| | | | |
|---|---|---|---|
| 1602810 | 6/1970 | Fed. Rep. of Germany | 29/568 |
| 2013403 | 10/1971 | Fed. Rep. of Germany | 29/568 |
| 2245922 | 4/1973 | Fed. Rep. of Germany | 29/568 |
| 2031777 | 4/1980 | United Kingdom | 29/568 |
| 404602 | 10/1973 | U.S.S.R. | 29/568 |
| 614926 | 7/1978 | U.S.S.R. | 29/568 |

Primary Examiner—William R. Briggs
Attorney, Agent, or Firm—Cantor and Lessler

[57] ABSTRACT

A lathe having a longitudinal slide, a longitudinal guide for said slide, a tool magazine and an automatic tool changer, the tool changer being arranged on the slide and the tool magazine having a number of tool storage holders arranged in rows along the guide.

6 Claims, 4 Drawing Figures

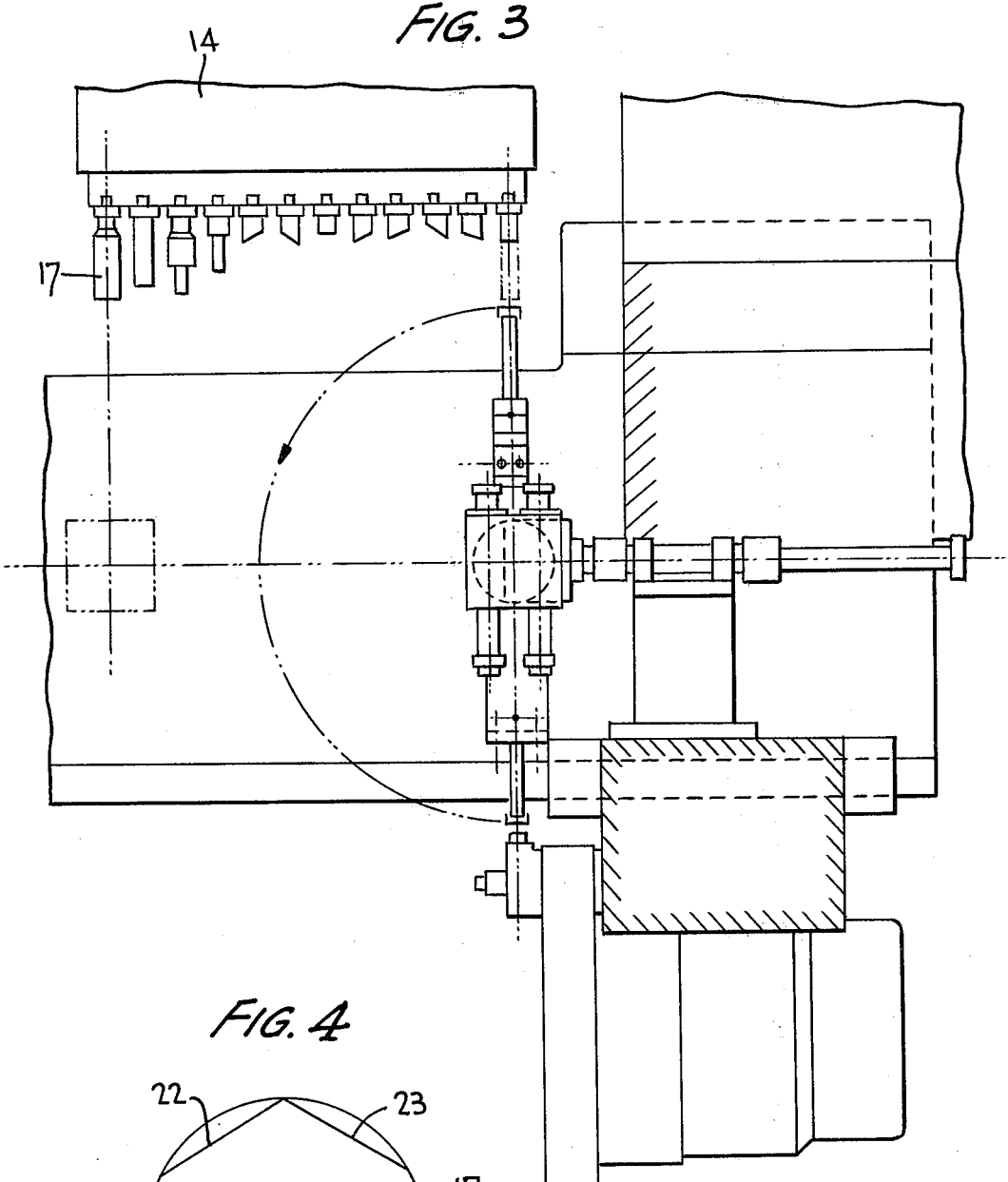
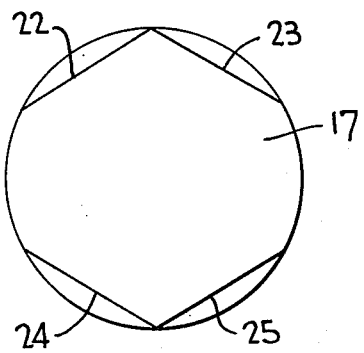

LATHE

BACKGROUND OF THE INVENTION

This invention relates to a lathe with a tool turret, a tool magazine and an automatically acting tool changer. Such a lathe is described, for example, in German Offenlegungschrift No. 1,627,034.

In prior art lathes, the tool magazine is arranged at the bed end of the lathe opposite the spindle box. A tool changer with a tool gripper is provided on an auxiliary slide, which can travel on a longitudinal guide path between the tool magazine and the lathe. For tool changing, it is necessary to first move the tool turret of the lathe into a change position. The tool magazine must then be turned into a given position, so that a free tool holder arrives in the right position to receive the already-used tool. Afterwards, the tool gripper is to be moved by means of its auxiliary slide such that the tool is transported from the turret to the magazine. The magazine is then turned again until the desired new tool arrives in the transfer position and the tool gripper can grip it and transport it to the turret.

There is thus needed in conventional lathes, apart from the positioning device for the magazine, a guide path for the auxiliary slide on which the tool gripper is seated, and also positioning devices for these auxiliary slides in both coordinate directions. The prior art lathe with automatic tool changer is thus costly and complicated.

It is already known from German Patentschrift No. 2,016,965 to arrange a tool magazine near the spindle box of a lathe, and to take the tools out of the tool magazine directly with the tool mounting of the faceplate of the lathe, instead of with a tool changer. This design saves the expensive tool changer. Of course, it is not suitable for storage of a large number of tools, since the tool magazine, constructed as a drum magazine, would become disproportionately large.

It is known from German Gebrauchsmuster No. 7,130,904 to construct a tool changer with a tool gripper such that the tool gripper is seated on the longitudinal slide of the lathe. The tool magazine, constructed as a drum magazine, is here arranged on the bed end of the lathe opposite the spindle box. The positioning device for the tool changer is also saved in this construction. However, it is again disadvantageous that the drum magazine can only store a small number of tools.

SUMMARY OF THE INVENTION

The object of the invention is to develop a lathe, of the kind stated at the beginning, which permits automatic changing of as large as possible a number of tools from a tool magazine, without the tool changer having to travel and be positioned on its own guide tracks for this purpose.

The tool turret of the lathe has a plurality of tool receivers, preferably twelve, so that a like number of different tools can be clamped in. The tool magazine has a like number of rows, each of a plurality, preferably ten, of tool storage holders, adjacent to each other along the longitudinal guide of the lathe. Thus, the tool changer can replace each individual tool of the tool turret a total of nine times in the preferred embodiment with a like, sharp tool when the one in the turret has become blunt. For this purpose, the longitudinal slide of the lathe travels into a position in which it is possible by means of the tool changer first to discard the used tool and then to take a new tool from the tool magazine.

The arrangement according to this invention makes it possible to travel along all twelve rows of the tool magazine without any positioning device for the tool changer. Thus, the lathe according to the invention is very simple and makes possible the use of a large store with large storage capacity.

An advantageous embodiment of the invention consists in that the tool magazine is a linear magazine and the tool storage holders, arranged at right angles to the longitudinal guide, can travel in rows and independently of each other, stepwise at right angles to the longitudinal guide of the lathe, respectively by one tool position. By this arrangement, after deposition of a tool in the magazine, a row of tools can be moved by a tool position, so that subsequently the new tool reaches the removal position and can be taken out by the gripper. The gripper thus does not need to be able to move over the whole height of a row of tools in the tool magazine. The arrangement according to the invention makes it possible to change the individual tools independently of each other. If, for example, one kind of tool is used twice as frequently as another, two rows of such tools could be provided in the tool magazine.

The tool magazine is particularly simple in construction by arranging the tool storage holders on ledges which are displaceable transversely of the longitudinal guide of the lathe.

Another embodiment of the invention is also convenient in which the tool magazine is arranged parallel to the faceplate guide and the ledges have latch devices which are constructed to be latched by the tool changer, and the tool changer has means to move over the ledges from position to latch position.

By this parallel alignment of the ledges with the faceplate guide, they can be displaced by one tool position by means of a simple lifting device on the tool gripper after discarding the used tool. The lifting device, therefore, only needs to make possible a lifting stroke such as to correspond in distance to two tool storage holders. Furthermore, by the alignment of the tool magazine, the tool gripper can always travel immediately and perpendicularly into the tool magazine.

It is also favorable if the tool magazine is arranged behind the lathe, since then a conventional workpiece changer with a guide path and a carriage can be arranged conventionally above the tool machine without the tool magazine hindering the workpiece changer. Furthermore, the tool magazine does not hinder the servicing of the lathe from the operator's side.

If the tool gripper is constructed to grip the tools endwise, the individual tools can be stored close together in the magazine, so that the tool magazine as a whole is made relatively small.

In order to prevent the tools turning in the gripper or even slipping axially out of the gripper, there are provided symmetrically opposite pairs of chamfers running at an obtuse angle to each other in each lateral surface of the tools.

BRIEF DESCRIPTION OF THE DRAWINGS

The invention permits of numerous modifications; one of them is schematically shown in the drawings and is described below. In the drawings:

FIG. 3 is a view of the arrangement as in FIG. 1, in the direction of the arrow III; and FIG. 4 is an end view of the shank of a tool for the tool magazine according to the invention.

DESCRIPTION OF THE PREFERRED EMBODIMENT

Figure 1:
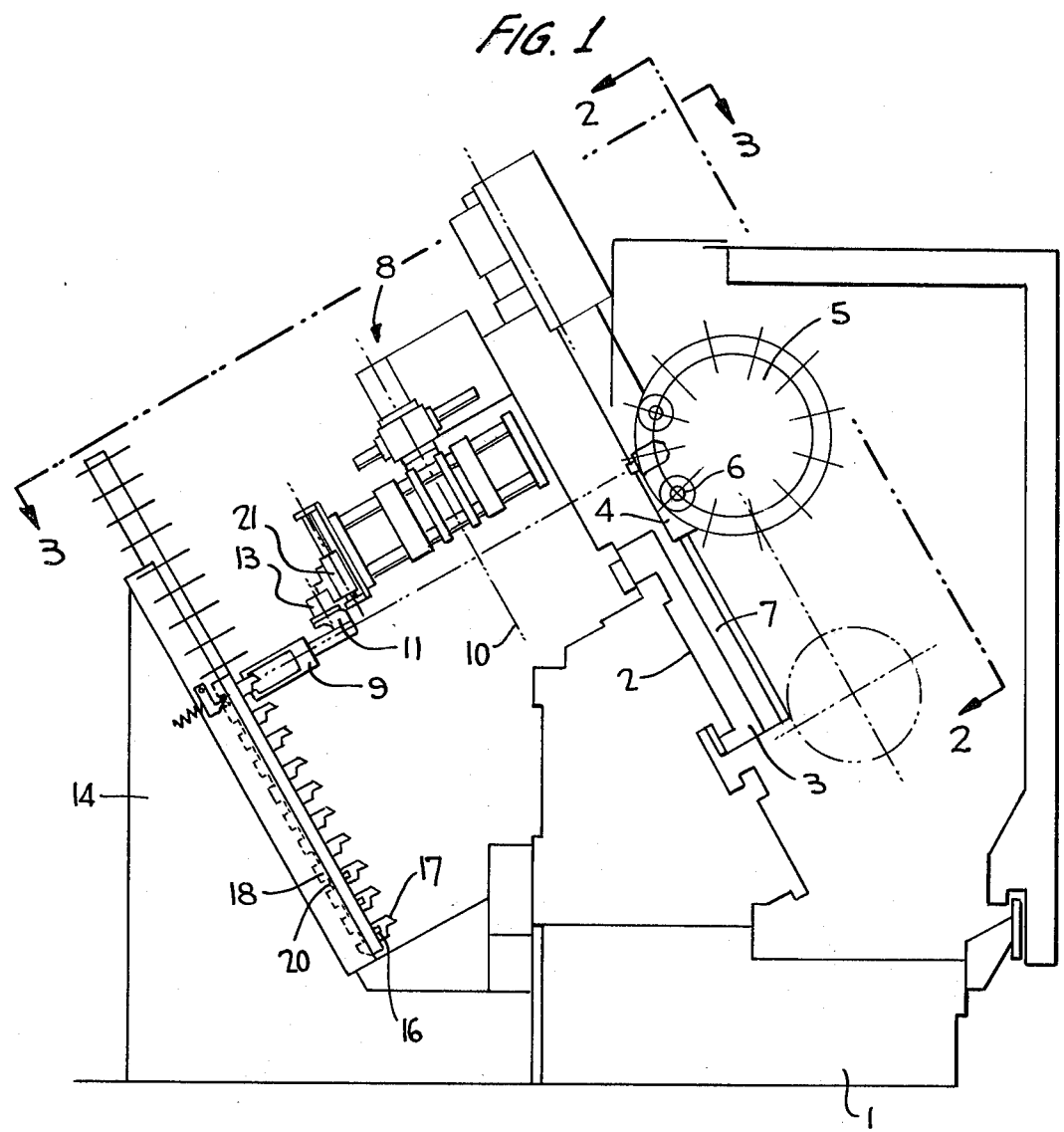
FIG. 1 is an end elevational view of the lathe in the direction of the spindle box, shown schematically.

FIG. 1 shows a bed 1 of a lathe, which has a longitudinal guide 2 for a longitudinal slide 3 of the lathe. On the longitudinal slide 3 there is conventionally seated a faceplate 4, displaceable on a cross guide 7, with a tool turret 5 which has twelve tool receivers 6.

A tool changer 8 with a tool gripper 9 is arranged on the longitudinal slide 3. The tool changer 8 as a whole is pivotable about an axis 10 which runs parallel to the cross guide 7. The tool gripper 9 is additionally pivotable by means of a rotation unit 13 about an axis 11 which runs parallel to axis 10.

Figure 2:
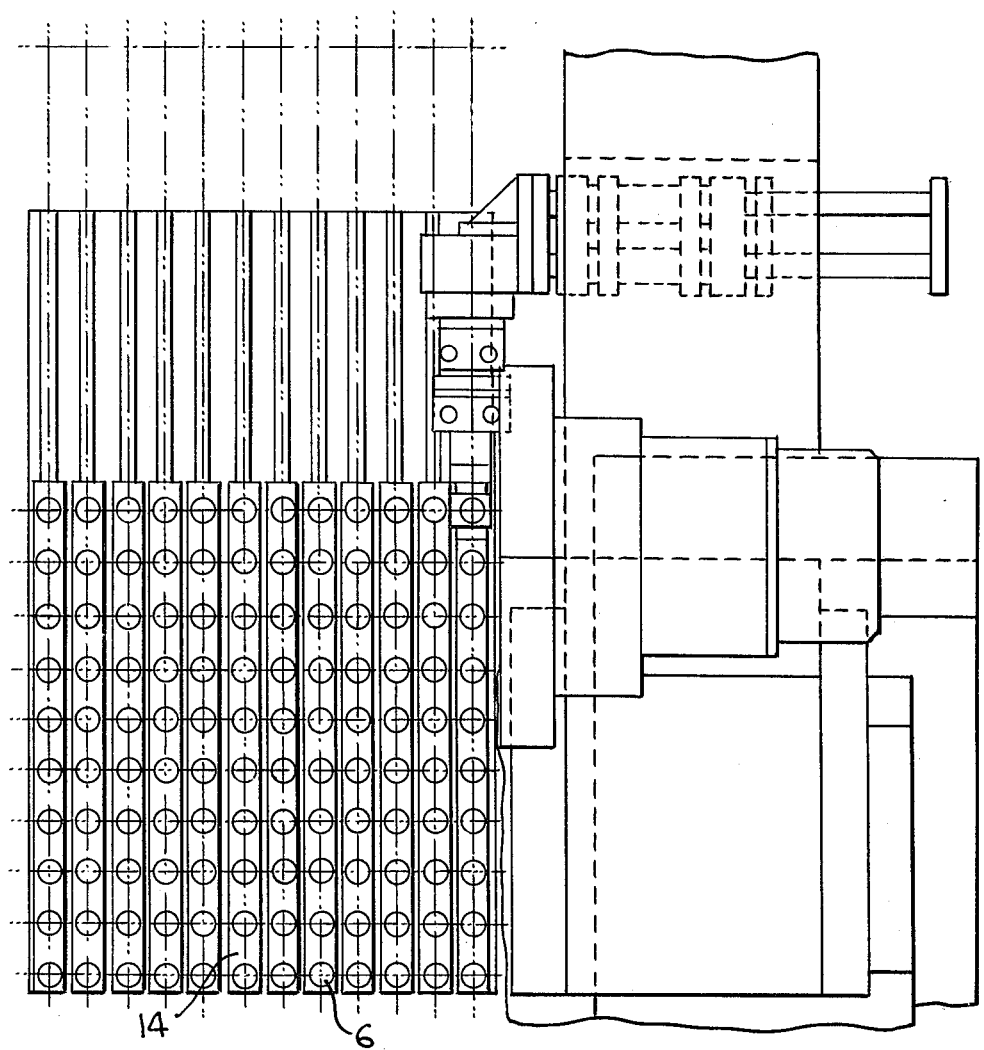
FIG. 2 is a view of the arrangement as in FIG. 1, in the direction of the arrow II.

Behind the lathe is arranged a tool magazine 14 which is constructed as a linear magazine and, as shown in FIG. 2, has adjacent each other twelve rows of tool storage holders 16 for tools 17. Each row contains respectively ten such tool storage holders one above the other. The tool magazine is aligned parallel to the longitudinal guide 2 and to the cross guide 7. The tool storage holders 16 of each row of tools 17 are respectively provided on a ledge 18, which has latches 20 corresponding to the spacing of the tool storage holders 16 and is to be displaced stepwise from latch position to latch position by means of lifting cylinder 21 of the tool gripper 9.

FIG. 4 shows that a total of four chamfers 22, 23, 24, 25 can be provided, symmetrically opposed and at an obtuse angle to each other, in the lateral surface of each tool. These chamfers ensure that the tool is held in the tool gripper, secured axially and non-rotatably.

Tool changing on the lathe according to the invention operates as follows. In the position of the tool changer 8 shown in FIG. 1, the tool gripper 9 is able to seize a tool 17 from the tool magazine 14 and, by turning of the tool changer 8 about the rotation axis 10, to forward it to the tool turret 5 as shown in FIG. 3. If tool 17 is a tool for internal machining, it must be turned back by a rotation of 90° about the rotation axis 11 of the tool gripper 9, so that it can be axially inserted into the tool turret.

If a tool 17 is to be taken from the tool turret 5 and replaced by a new one, the tool changer 8 first forwards this tool into the empty tool storage holder 16 of tool magazine 14. Subsequently, the lifting cylinder 21 of the tool gripper 9 is actuated. By this means, the ledge 18 of the tool magazine 14 is lifted by one latch position 20 and latched there. The lifting cylinder 21 now moves back into its old position, so that the tool gripper 9 is opposite a new tool and can seize this and forward it to the tool turret 5. Also, on the next tool change, the tool gripper 9 first discards the old tool and then again lifts the ledge 18 by one latch position, so that subsequently the new tool is always held ready in one and the same position.

To bring up successive tools arranged adjacent in the tool magazine 14, the longitudinal slide of the lathe has to travel along by means of its numerical control such that the respective desired tool lies exactly opposite the tool changer 8.

If all tools are to be taken from the tool magazine and returned again, the tools and the tool magazine are mutually pushed down. Of course, it is also possible to make the tool magazine automatic by means of a suitable apparatus.

What is claimed:

1. A lathe having a longitudinal slide, a longitudinal guide for said slide, a cross guide carrying a faceplate on said slide, a tool turret mounted on said faceplate, a tool magazine and an automatic tool changer,
   (a) said tool changer being arranged on said longitudinal slide,
   (b) said tool magazine having a plurality of ledges arranged transverse to the longitudinal guide and a plurality of tool storage holders arranged on said ledges at right angles to said longitudinal guide and in adjacent rows along said longitudinal guide, and
   (c) said tool magazine being arranged parallel to the cross guide, and the ledges being provided with latching means adapted to be unlatched by said tool changer, said tool changer having means for shifting the ledges from one latched position to another.

2. A lathe according to claim 1, wherein the tool gripper contains means to grip the tools endwise.

3. A lathe according to claim 1, wherein the tools are provided with symmetrically opposite respective pairs of chamfers, running at an obtuse angle to each other on each lateral surface thereof.

4. A lathe having a longitudinal slide, a longitudinal guide for said slide, a tool turret mounted on said slide, a stationary linear tool magazine and an automatic tool changer,
   (a) said tool changer being arranged on said longitudinal slide,
   (b) said tool magazine having a plurality of tool storage holders at right angles to said longitudinal guide and in adjacent rows along said longitudinal guide, and
   (c) means to displace said tool storage holders, stepwise, a respective tool position at a time, in rows and independently of each other at right angles to the longitudinal guide.

5. A lathe according to claim 4, wherein the tools are provided with symmetrically opposite respective pairs of chamfers, running at an obtuse angle to each other on each lateral surface thereof.

6. A lathe according to claim 4, wherein the tool gripper contains means to grip the tools endwise.

* * * * *